United States Patent [19]

Hackman

[11] 3,765,733

[45] Oct. 16, 1973

[54] BEARING ASSEMBLY

[75] Inventor: Kenneth V. Hackman, Arcadia, Calif.

[73] Assignee: Southwest Products Co., Monrovia, Calif.

[22] Filed: Sept. 13, 1971

[21] Appl. No.: 179,829

[52] U.S. Cl. .................................................. 308/72
[51] Int. Cl. ............................................ F16c 23/04
[58] Field of Search.......................... 308/72, 240, 28

[56] References Cited
UNITED STATES PATENTS

| | | | |
|---|---|---|---|
| 1,382,355 | 6/1921 | Greiner | 308/884 |
| 2,761,746 | 9/1956 | Abel | 308/72 |
| 2,952,144 | 9/1960 | Holmes, Jr. | 308/72 |
| 3,174,811 | 3/1965 | Schmidt et al. | 308/72 |
| 3,655,249 | 4/1972 | Abel | 308/72 |

Primary Examiner—Charles J. Myhre
Assistant Examiner—Frank Susko
Attorney—Lyon & Lyon

[57] ABSTRACT

A bearing assembly includes a cylindrical bushing and a ball-shaped bearing member having a spherical bearing surface retained on said bushing, together with a race member having a spherical bearing surface complementary with a ball surface and contacting the same, the ball member is retained on the bushing by a retaining ring in a groove on the bushing.

5 Claims, 2 Drawing Figures

Patented Oct. 16, 1973

3,765,733

INVENTOR.
KENNETH V. HACKMAN
BY Lyon & Lyon
ATTORNEYS

BEARING ASSEMBLY

The present invention relates to improved bearing constructions wherein it is desired to accommodate misalignment between the axis of a rotatable shaft and its support.

An object of the present invention is to provide a self-aligning bearing for rotatable shafts.

A specific object of the present invention is to provide an improved self-aligning bearing construction involving a bushing which is secured relative to an outer race member and an inner ball-shaped bearing member in a novel manner.

Another specific object of the present invention is to provide an improved bearing construction of this character which is easily assembled and disassembled as desired both in original manufacture and in use and servicing.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2:
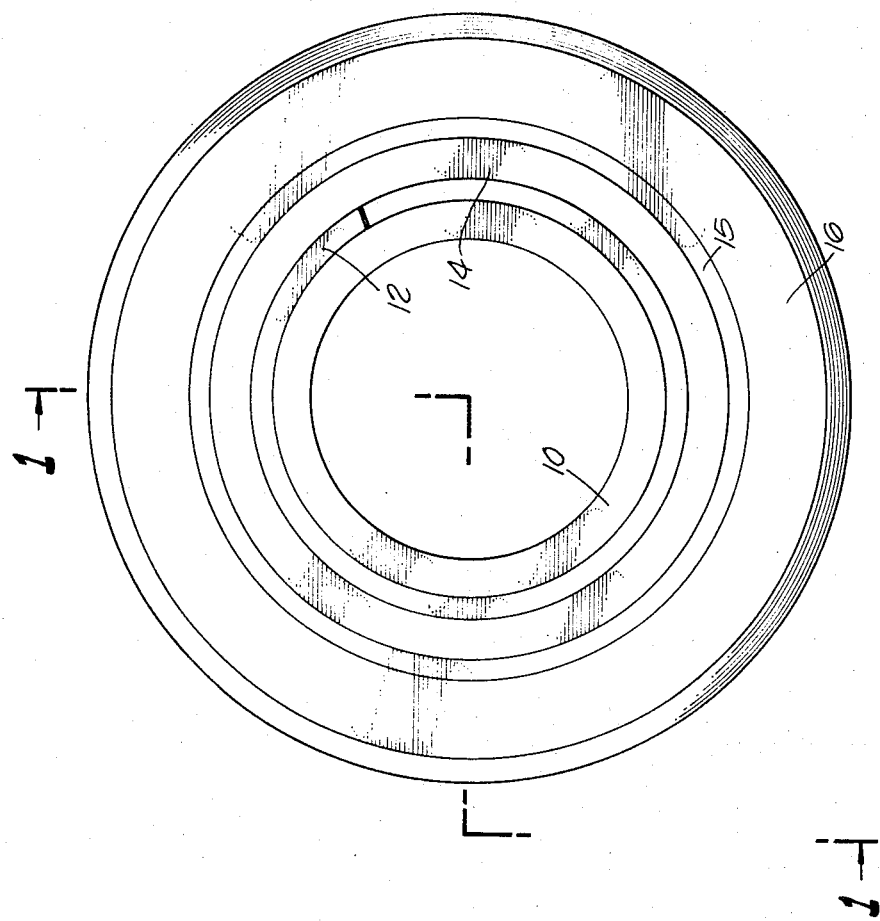
FIG. 2 is a view in side elevation of the bearing illustrated in FIG. 1.
Figure 1:
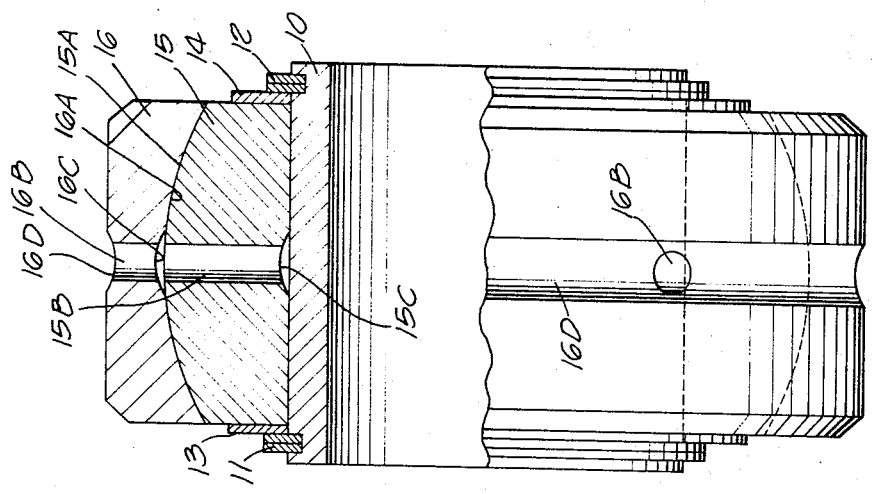
FIG. 1 is an end view partly in section of the bearing construction embodying features of the present invention, the section being taken as indicated by the line 1—1 in FIG. 2.

The bearing assembly includes a steel cylindrical bushing 10 which is externally grooved near its ends for the reception and retention of split steel retaining rings 11, 12. Between these steel retaining rings are a pair of washers 13, 14 and a spherical bearing assembly which includes a ball shaped bearing member 15 of berylium copper within an outer race member 16. This outer race member 16 of steel has an inner spherical surface 16A complementary with the outer spherical surface 15A of the bearing member 15, there being uniform clearance between these two bearing surfaces.

This outer race member 16 may be retained in a holder (not shown by, for example, press fitting) of a machine or mechanism which includes also a shaft (not shown) fitted within the bushing 10 and the assembly then provides for support and guided rotation with or without misalignment of such shaft with respect to such holder.

Anti-friction means such as oil may be used between the ball member 15 and race member 16 as well as between the ball member 15 and bushing 10; and for that purpose, three radial holes 16B are provided in race member 16 spaced 120 degrees apart, and likewise, three such spaced radial holes 15B are likewise present in the ball member 15. Further, the outer race member 16 may be provided with internal and external lubrication grooves 16C, 16D, and an internal lubrication groove 15C may also be provided.

The assembly may be press fitted or loosely fit onto a shaft (not shown) extending through bushing 10, and likewise, the outer race member 16 may be press fitted or loosely fitted into a holder which is either stationarily mounted with respect to such shaft or which has some limited movement with respect to such shaft.

I claim:

1. A bearing assembly including a cylindrical bushing, a truncated ball shaped bearing member having a spherical bearing surface secured on said bushing, a single piece race member having a spherical bearing surface complementary with said ball surface and contacting the same, said complementary surfaces being bearing surfaces which provide freedom of movement between said ball shaped member and said race member, and said single piece race member being in the form of a continuous retaining ring which prevents escape of said ball shaped member in all possible positions from within said race member, said ball and race member being an assembly fitted on said bushing without any element contacting said race member and without any element, other than said ball being connected directly between said bushing and said race member such that said race member is free to move without restraint on such ball, said cylindrical bushing having a length greater than the overall width of said ball through which it extends and also greater than the overall width of said race member, and retaining means externally of and on and near the ends of said bushing which extend beyond said ball and contact the opposite side walls of said truncated ball shaped member and securing said ball shaped member on said bushing.

2. An assembly as set forth in claim 1 in which said ball and said race member are metal and make metal to metal contact.

3. An assembly as set forth in claim 1 in which said race member and said ball member are each provided with lubrication channels.

4. A bearing assembly as set forth in claim 1 in which said retaining means includes at least one washer on said cylindrical bushing, said bushing having an external grooved portion, a split ring in said grooved portion and retaining said washer between it and said truncated ball shaped bearing member.

5. A bearing assembly as set forth in claim 4 in which the retaining means on each side of the truncated ball shaped member is the same.

* * * * *